United States Patent
Hehenberger et al.

(10) Patent No.: US 6,325,217 B1
(45) Date of Patent: Dec. 4, 2001

(54) BACKFLUSH ATTACHMENT FOR A FILTERING DEVICE

(76) Inventors: Gerhard Hehenberger, A-4622, Eggendorf No. 108; Andreas Teuber, Untervisnitz 7, A-4210 Gallneukirchen; Johannes Remili, Thalhamerstrasse 19, A-4062 Thening, all of (AT)

( * ) Notice: Subject to any disclaimer, the term of this patent is extended or adjusted under 35 U.S.C. 154(b) by 0 days.

(21) Appl. No.: 09/711,290

(22) Filed: Nov. 14, 2000

(30) Foreign Application Priority Data

Nov. 16, 1999 (AT) ........................................ 1930/99

(51) Int. Cl.$^7$ ........................ B01D 35/12; B01D 29/62; B29C 47/68
(52) U.S. Cl. ........................ 210/411; 210/341; 210/425; 425/197; 425/199
(58) Field of Search ........................ 210/411, 340, 210/341, 236, 427, 425, 333.01; 428/197, 199

(56) References Cited

U.S. PATENT DOCUMENTS

| | | | |
|---|---|---|---|
| 3,243,849 | * | 4/1966 | Joukainen . |
| 3,896,029 | * | 7/1975 | Beuselinck . |
| 3,940,222 | * | 2/1976 | Zink . |
| 5,779,898 | * | 7/1998 | Schwanekamp et al. . |

FOREIGN PATENT DOCUMENTS

| | | | |
|---|---|---|---|
| 684976 | * | 4/1964 | (CA) . |
| 4218756 | * | 4/1993 | (DE) . |
| 4408803 | * | 9/1995 | (DE) . |
| 1950959 | | 3/1996 | (DE) . |
| 554237 | * | 8/1993 | (EP) . |
| 50-003346 | * | 2/1975 | (JP) . |

* cited by examiner

Primary Examiner—Thomas M. Lithgow
(74) Attorney, Agent, or Firm—Roth well, Figg, Ernst & Manbeck

(57) ABSTRACT

A backflush attachment for a filtering device, in particular for a plastics melt filter, the backflush attachment comprising a housing having guide channels following an entry bore, as well as backflushing channels, and at least one rotary piston which enables a flow passage in the respective guide channel when in its passing position and which interrupts the passage in the guide channel from the entry bore to the filtering device when in its closing position while providing a connection of a portion of the respective guide channel with an associated backflushing channel leading outside of said housing, the rotary piston having an eccentrically arranged passage channel of constant cross-section substantially corresponding to the cross-section of the guide channel, the axis of rotation of the rotary piston extending eccentrical in corresponding manner relative to the axis of the guide channel, and the passage channel forming a part of the guide channel when the rotary piston is in its passing position, whereas it provides for the connection to the backflushing channel when the rotating piston is in its closing position.

11 Claims, 3 Drawing Sheets

BACKFLUSH ATTACHMENT FOR A FILTERING DEVICE

FIELD OF THE INVENTION

The invention relates to a backflush attachment for a filtering device, in particular for a plastics melt filter, the backflush attachment comprising a housing having guide channels following an entry bore, as well as backflushing channels, and at least one rotary piston which clears a passage in the respective guide channel when in its passing position and which interrupts the passage in the guide channel from the entry bore to the filtering device when in its closing positon while providing a connection of a portion of the respective guide channel with an associated backflushing channel leading outside of said housing.

BRIEF DESCRIPTION OF THE BACKGROUND ART

Since filtering devices become clogged by the particles which they retain from the flows to be filtered, in particular plastics melt flows, and thus the passage of the fluid to be filtered would be disturbed in the long run, it is necessary to clean the filtering devices. Often filtering devices are used in which the passing medium is subdivided by the assistance of two guide channels into two partial flows, each partial flow is filtered separately, and subsequently the two partial flows are united again. In such filtering devices, the filtering elements therefore can be cleaned in that a control device, with injection molding devices and the like also termed backflush attachment, is provided by means of which it is possible to control the passage of the fluid to be filtered. In doing so, in the backflush position, the fluid enters a guide channel in a flow direction which is equal to the usual flow direction, flows through the associated filter and subsequently flows through the second filter and returns in the second guide channel, i.e. contrary to its flow direction in the normal state of operation. In doing so, the fluid flow entrains the particles adhering to the second filter. Thereafter, the fluid polluted with these particles is led out of the backflush attachment via control elements. Thus, the filtering device can be cleaned in a simple way. As a rule, the control elements of known backflush attachments include reductions or steps as compared to the remaining flow channels in the housing of the backflush attachment, which are necessary so as to maintain a certain pressure within the filtering device. Pollutants adhere to these reductions, or steps, respectively, which may block the control elements and thus greatly reduce the useful life of such backflush attachments. Moreover, the control elements of the backflush attachments frequently get into contact with the atmosphere resulting in a coking of the fluids, in particular in case of plastics melts. By this, hard layers are formed on the control elements which will have to be removed at regular intervals since otherwise the control elements may also become blocked thereby.

From DE 195 09 059 C1, a control device is known in which the supply to and discharge from two guide channels is controlled by means of rotary pistons. The flow channels in the rotary pistons have, however, a substantially smaller cross-section than the guide channels so as to provide for a pressure build-up, resulting in shoulders, or steps, respectively, at the channel transitions, primarily at the entry into the rotary piston, with deposits forming thereat which reduce the operability of the control device. In addition, the fluid is highly deflected in the rotary piston, and this deflection also contributes to the formation of deposits in the channels of the rotary piston in a detrimental manner. The pronounced deflections of the channels in the rotary piston do not only have the disadvantage of forming deposits, but are also complex to produce and thus involve high production costs.

It is an object of the present invention to prevent these deposits in the channels of the rotary piston, so that the useful life of such a backflush attachment is substantially increased and, moreover, the maintenance time and costs are reduced.

Moreover, it is another object of the invention to reduce the deflections of the fluid by providing an appropriate path of the channels in the rotary piston so as to avoid further deposits and to simplify the requirements of manufacture and thus lower the production costs.

SUMMARY OF THE INVENTION

In a backflush attachment according to the invention, the rotary piston has an eccentrically arranged passage channel of constant cross-section substantially corresponding to the cross-section of the guide channel, the axis of rotation of the rotary piston extending eccentrically in corresponding manner relative to the axis of the guide channel, and the passage channel forming a part of the guide channel when the rotary piston is in its passing position, whereas it provides for the connection to the backflushing channel when the rotary piston is in its closing position. By the eccentrical arrangement of the passage channel it is possible in an advantageous manner to ensure an unimpeded flow through the rotary piston and the guide channel (in the passage position of the rotary piston) by means of a single passage bore, and to form a connection with the backflushing channel in the closing position of the filtering device. Furthermore, the formation of deposits is prevented by the step-free transition between guide channel, or backflush channel, respectively, and passage channel and by the constant cross-section of the passage channel.

Cleaning of the filtering device can be performed with a particularly easy construction if two guide channels are provided and one rotary piston is provided for each guide channel.

In order to keep manufacturing requirements as low as possible and thus to keep production costs advantageously low it is suitable if the passage channel is formed by a straight-line eccentrical bore in the rotary piston.

For the step-free transition between the passage channel and the guide channel, it is advantageous if in its passing position the passage channel follows on the guide channel portions in the housing in coaxial alignment.

For the step-free transition between passage channel and backflushing channel, it is further advantageous if the cross-section of the backflushing channel substantially corresponds to the cross-sections of the passage channel and the guide channel.

Likewise, it is suitable for a step-free transition between the passage channel and the backflushing channel if the passage channel merges with the backflushing channel in coaxial alignment in its closing position.

In order to largely avoid greater deflections of the fluid passing the filtering device, and thus to avoid deposits, it is also advantageous if the passage channel and the entering guide channel portion of the housing enclose an obtuse angle when the rotary piston is in its closing position.

In order to prevent falling of the pressure in the filtering device below a certain value, it is advantageous if a throttle, e.g., a screwed-in nozzle of adjustable cross-section, is located in the backflushing channel so as to provide for a pressure build-up.

For a compact assembly as well as simple handling from the outside, finally, it is advantageous if a pivoting means is directly coaxially installed on the or each rotary piston so as to rotate the rotary piston from its passing position into its closing position, and vice-versa. Of course, it is also possible to employ other pivot drives, such as, e.g., a hydraulic cylinder with a linearly moved toothed rack that drives a pinion non-rotationally mounted on the rotary piston, or to use a pressure-cylinder driven pivot lever attached on the rotary piston.

BRIEF DESCRIPTION OF THE DRAWINGS

In the following, the invention will be explained in more detail by way of a preferred exemplary embodiment illustrated in the drawings to which, however, it shall not be restricted. In detail.

DESCRIPTION OF PREFERRED EMBODIMENTS

Figure 1:
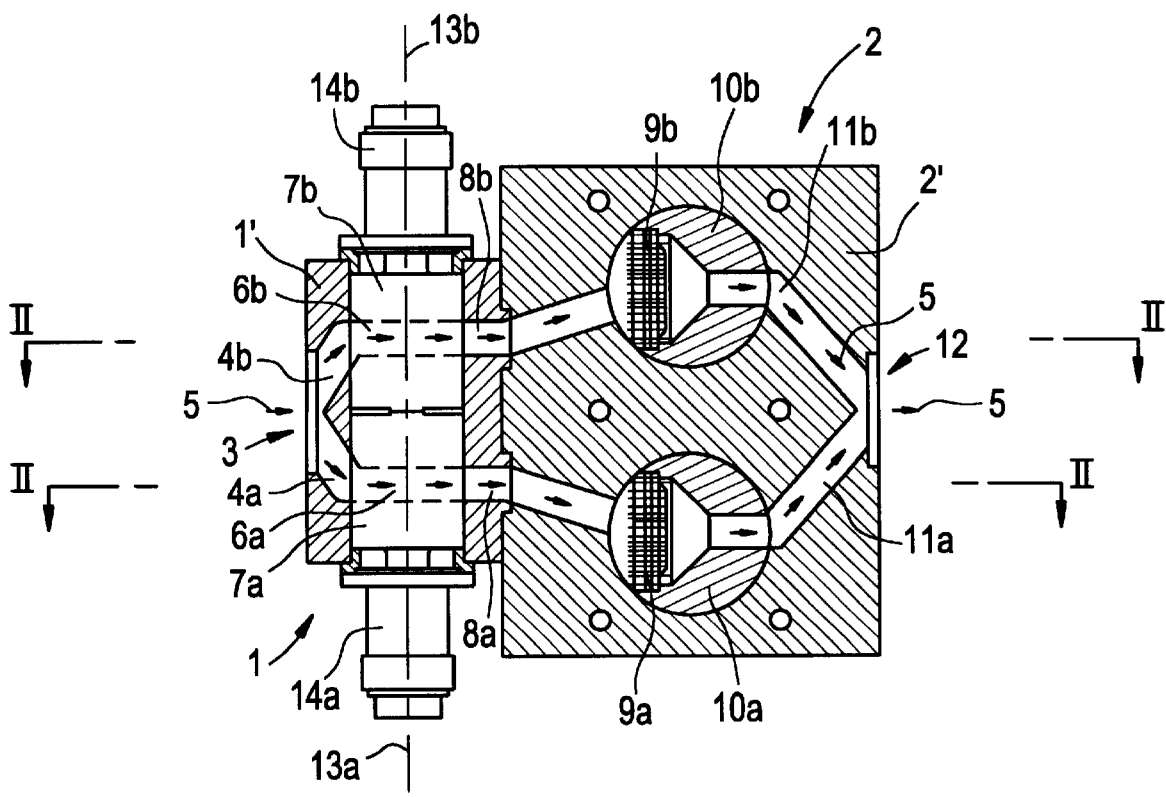
FIG. 1 shows a sectional view of a backflush attachment installed on a plastics melt filter in production position.

FIG. 1 shows a backflush attachment 1 installed on a plastics melt filter 2 which in turn is connected with a mould tool (not illustrated). The thermoplastic plastics melt enters the backflush attachment 1 via an entry bore 3. In housing 1' of the backflush attachment 1, the melt flow is evenly distributed to two guide channels 4a, 4b. In the production or normal operation position illustrated in FIG. 1, the passage channels 6a, 6b of rotary pistons 7a, 7b follow in alignment upon the entry-side portions of the guide channels 4a, 4b in flow direction 5 of the plastics melt. In this manner, the melt flow can flow unimpededly into and through the passage channels 6a, 6b. In the housing 1', the passage channels 6a, 6b are followed by guide channel portions 8a, 8b departing therefrom in alignment, too. Since the cross-sections of the passage channels 6a, 6b and those of the guide channels 4a, 4b are substantially equal and the axes of these channels are aligned in the passage position (production position), as illustrated in FIG. 1, smooth transitions are ensured, with practically no steps being present at the transitions between the channels. In practice it has been shown that for a better adaptation of the rotary pistons 7a, 7b during installation, with respect to the different intersections of the channels 4a, 4b, 6a, 6b, 8a, 8b with the cylinder areas, it is usually more suitable to provide passage channels 6a, 6b of a slightly smaller cross-section in the rotary pistons 7a, 7b.

From the guide channel portions 8a, 8b, the two melt flows enter housing 2' of the filtering device 2, or channels provided there which are not denoted in detail, respectively, and there they are cleaned in conventional manner by filtering elements 9a, 9b mounted on rotary pistons 10a, 10b. Subsequently, the melt flows are re-united again by means of channels 11a, 11b, and they leave the filtering device 2 together at an exit bore 12.

The rotary pistons 7a and 7b, respectively, of the backflushing attachment 1 are arranged to be freely rotatable about their longitudinal axes 13a, 13b in the housing 1', and for this purpose, two pivoting devices 14a and 14b, respectively, e.g. coaxially attached, pressure-controlled rotating devices, yet optionally also pivot-lever or toothed rack drives, are provided externally of the backflushing attachment 1.

Figure 2:
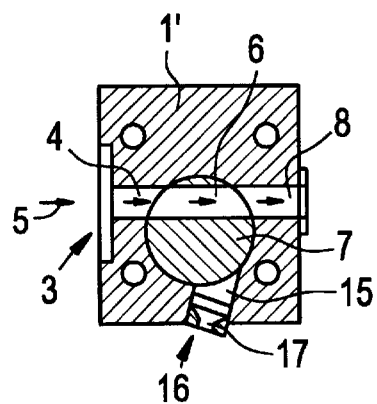
FIG. 2 shows a sectional view of the backflush attachment according to line II—II of FIG. 1.

FIG. 2 shows a sectional view of the backflushing attachment 1 according to any one of lines II—II of FIG. 1. Since in FIG. 1 both rotary pistons 7a, 7b are in their passing positions, the section II—II may be led with the same results either through piston 6a which is the lower one in FIG. 1, or also through piston 6b which is the upper one in FIG. 1, and consequently, indices a, b are not used in the further description of FIG. 2.

In FIG. 2, the common entry bore 3 is visible which is followed in flow direction 5 by the guide channel 4. As shown, in the production position, the eccentrically arranged passage channel 6 of the rotary piston 7 is oriented in an aligned, coaxial position to the associated guide channel 4, i.e. the portions (e.g. 8) thereof. Due to the practically equal cross-sections of the passage channel 6 and the guide channel 4, as is particularly clearly visible by way of FIG. 2, there are no steps at the transitions between the portions of the guide channel 4 and the passage channel 6 at which deposits could be formed. Furthermore, in FIG. 2 the backflushing channel 15 is partly recognizable which, in the production position illustrated in FIG. 2, is not connected with the passage channel 6. Backflushing channel 15 has also substantially the same cross-section as passage channel 6. To ensure the required pressure in the backflushing attachment 1 in the backflushing position, a nozzle 16 is provided at the outer end of the backflushing channel 15 as a throttle. For an adaptation to the different viscosities of the plastics melt to be processed, the cross-section 17 of the nozzle 16 can be adjusted. Nozzle 16 is screwed into housing 1' and thus can simply be removed from housing 1' for cleaning purposes.

Figure 3:
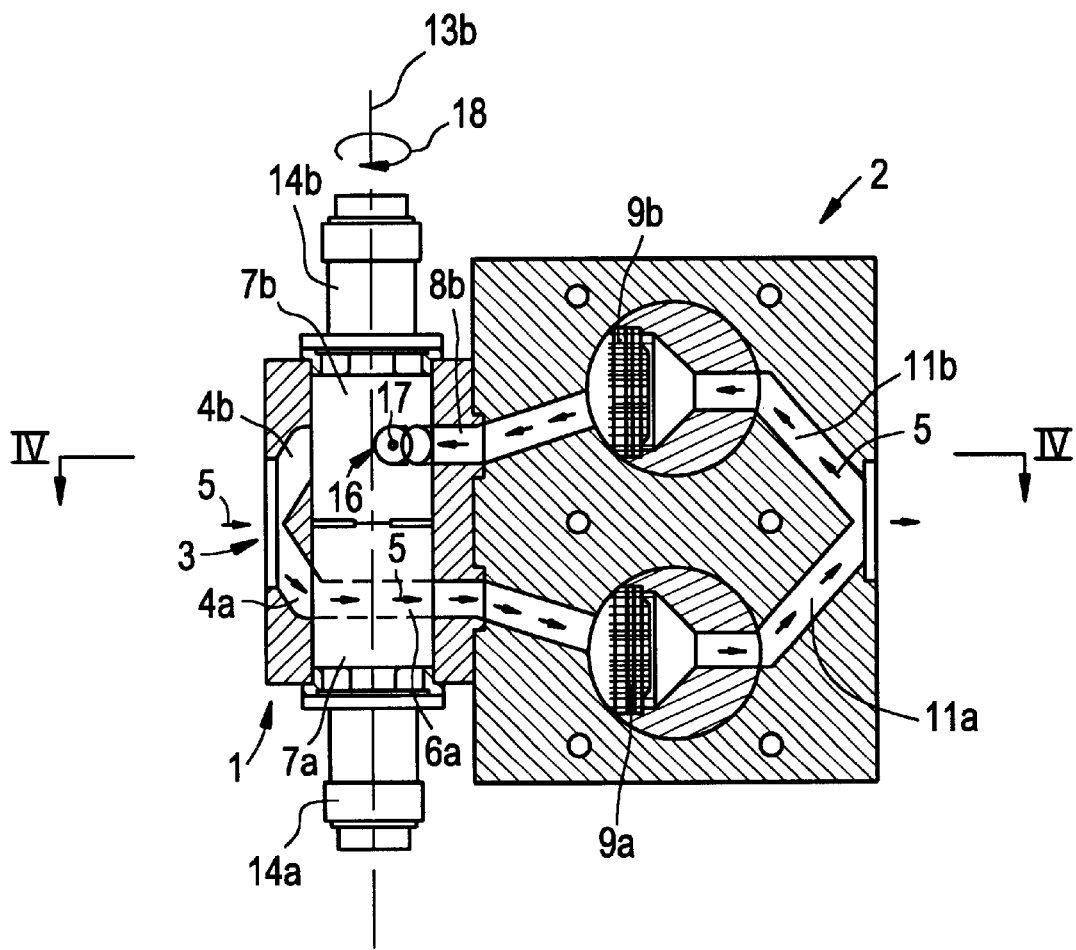
FIG. 3 shows a sectional view of the backflush attachment installed on the plastics melt filter in one of two possible backflushing positions.
Figure 4:
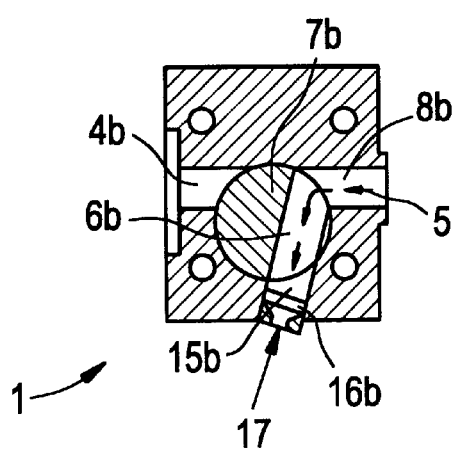
FIG. 4 shows a sectional view of the backflush attachment according to line IV—IV of FIG. 3.

FIG. 3 shows the backflushing attachment 1 again in its state attached to the plastics melt filter 2, yet other than in FIG. 1, the rotary piston 7b, which is the upper one in FIG. 3, is in its closing position, into which it has been brought by rotation about its axis 13 in the direction of arrow 18, cf. also FIG. 4. Again, the melt flow enters through the entry bore 3 in the direction of arrow 5 in the entry-side portions of the guide channels 4a, 4b. Due to the closing position of the upper rotary piston 7b the upper melt flow cannot enter passage channel 6b. Hence the melt flow will only flow via the lower guide channel 4a in the direction of arrow 5 and the passage channel 6a of the lower rotary piston 7a. Subsequently the melt flow will be cleaned by filtering element 9a. After passing through channel 11a, a partial flow returns to channel 11b resulting in a "backflushing" of the upper channels and, in particular, of the filter 9b: By flowing through the filtering element 9b in a direction contrary to the normal direction, the melt flow entrains the particles deposited on the filtering element 9b, and subsequently, it enters the passage channel 6b of the rotary piston 7b which is in its closing position via the guide channel portion 8b. Passage channel 6b now follows evenly, i.e. without any step but angularly, on the guide channel portion 8b, and coaxially merges into the backflow channel 15b. Thus, the polluted melt flow which has entrained the particles deposited on the filtering element 8b is supplied via passage channel 6b to the backflushing channel 15 and the nozzle 16b that serves for a pressure build-up. Subsequently, the partial melt flow is conducted away from the backflush attachment 1 via outlet opening 17.

Besides, the remaining melt (with the afore-mentioned partial flow withdrawn) will be supplied as usual to the tool (not illustrated).

FIG. 4 shows a sectional view of the backflush attachment 1 according to line IV—IV of FIG. 3. Here, rotary piston 6b is shown in its closing position. Hence the passage channel 6b which extends eccentrically to the axis of rotation 13b is not connected with the entry-side portion of the guide channel 4b, but is connected with the other guide channel portion 8b. The guide channel portion 8b and the passage channel 6b substantially have the same cross-sections, whereby the plastics melt can pass the passage channel 6b in the direction of arrow 5 without flowing over a step. To avoid a more pronounced deflection of the highly polluted melt flow, the passage channel 6b and the guide channel portion 8b enclose an obtuse angle. After having passed the passage channel 6b, the melt flow flows into the backflushing channel 15b which is followed by nozzle 16b. Thus, a cross-sectional narrowing, in which particles of the polluted plastics melt might deposit, first occurs in the end region of the nozzle 16. However, these deposits do not impede the function of the control elements as such, and they may simply be removed after nozzle 16b has been screwed out of the housing 1'.

Figure 5:
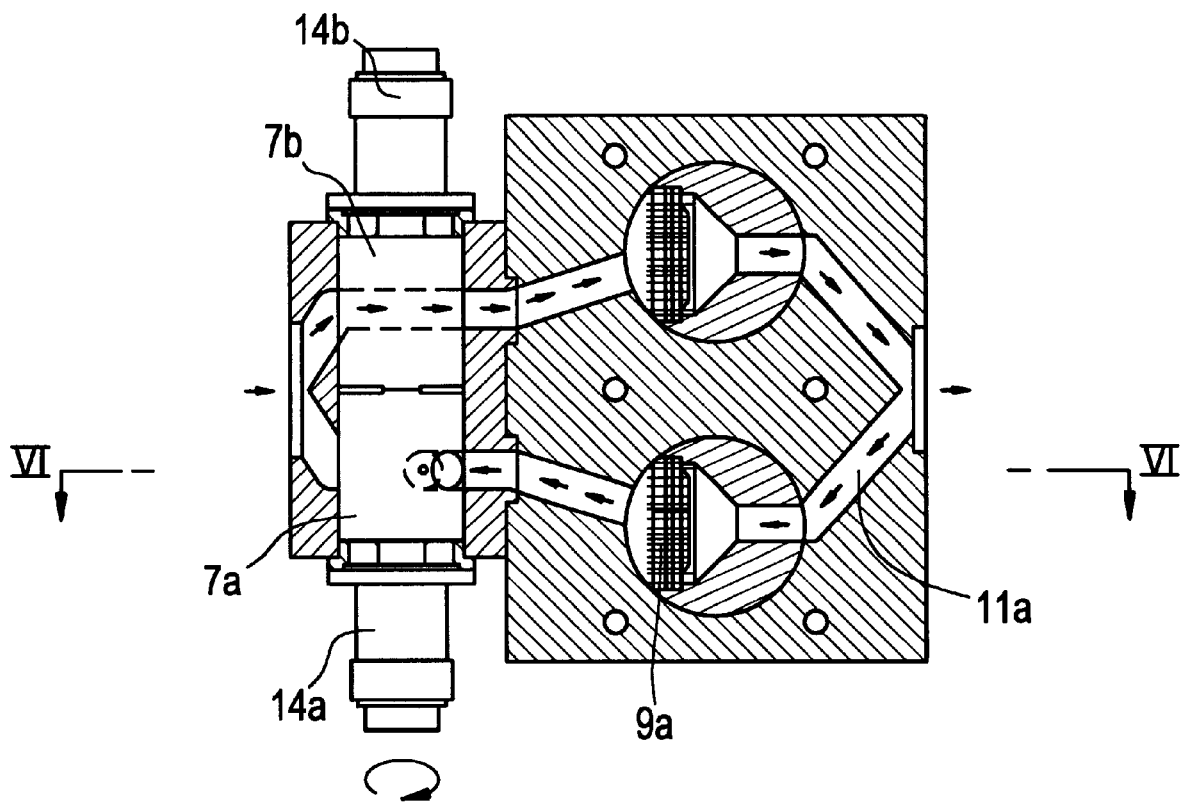
FIG. 5 shows a sectional view of the backflush attachment installed on a plastics melt filter in the other backflushing position.
Figure 6:
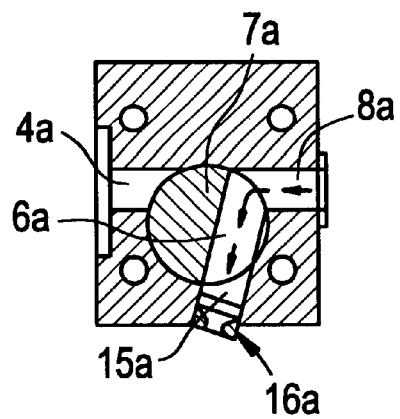
FIG. 6 shows a sectional view of the backflush attachment according to line VI—VI of FIG. 5.

FIG. 5 and FIG. 6 substantially show the situation as described by way of FIGS. 3 and 4, in connection with rotary piston 7a which is the lower one in FIG. 5 in its closing position; rotary piston 7b is in its passing position. In this manner, filtering element 9a, which is the lower one in FIG. 5, is being cleaned. What has previously been said in connection with FIGS. 3 and 4 also applies here analogously, with merely exanging the indices "a" and "b", thus, a new, complete description is not required.

What is claimed is:

1. A backflush attachment for a filtering device, said backflush attachment comprising a housing including an entry bore, guide channels of a certain cross-section following said entry bore, and backflushing channels, and at least one rotary piston rotatable about an axis of rotation between a passing position and a closing position, said rotary piston in its passing position enabling a flow passage in a respective guide channel from said entry bore to said filtering device, and in its closing position interrupting said passage in said guide channel while providing a connection between a portion, of the respective guide channel and an associated backflushing channel leading outside of said housing, said at least one rotary piston including a single, straight-line eccentrically located passage channel of constant cross-section, said passage channel cross-section substantially corresponding to said guide channel cross-section, said axis of rotation of said at least one rotary piston extending eccentrically in corresponding manner relative to an axis of said guide channel, said passage channel forming part of said guide channel when said rotary piston is in its passing position while providing a connection to said backflushing channel when said rotary piston is in its closing position.

2. A backflush attachment as set forth in claim 1, wherein said filtering device is a plastics melt filter.

3. A backflush attachment as set forth in claim 1, wherein two guide channels are provided, one respective rotary piston being provided for each guide channel.

4. A backflush attachment as set forth in claim 3, further comprising pivoting means directly coaxially installed on each one of said at least one rotary piston so as to rotate said associated rotary piston from said passing position into said closing position and vice-versa.

5. A backflush attachment as set forth in claim 1, wherein in said passing position of said rotary piston, said passage channel follows said guide channel portions in said housing with coaxial alignment.

6. A backflush attachment as set forth in claim 1, wherein said cross-section of said backflushing channel substantially corresponds to said cross-sections of said passage channel and of said guide channel.

7. A backflush attachment as set forth in claim 1, wherein in said closing position of said rotary piston, said passage channel merges into said backflushing channel with coaxial alignment.

8. A backflush attachment as set forth in claim 1, wherein said passage channel and said guide channel portion of said housing entering therein enclose an obtuse angle when said rotary piston is in its closing position.

9. A backflush attachment as set forth in claim 1, further comprising a throttle provided in said backflushing channel so as to provide for a pressure buildup.

10. A backflush attachment as set forth in claim 9, wherein said throttle is a screwed-in nozzle of adjustable cross-section.

11. A backflush attachment as set forth in claim 1, further comprising pivoting means directly coaxially installed on said at least one rotary piston so as to rotate said associated rotary piston from said passing position into said closing position and vice-versa.

* * * * *